(12) United States Patent
Biadsy et al.

(10) Patent No.: US 9,966,064 B2
(45) Date of Patent: May 8, 2018

(54) DIALECT-SPECIFIC ACOUSTIC LANGUAGE MODELING AND SPEECH RECOGNITION

(75) Inventors: Fadi Biadsy, New York, NY (US); Lidia Mangu, New York, NY (US); Hagen Soltau, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1370 days.

(21) Appl. No.: 13/552,401

(22) Filed: Jul. 18, 2012

(65) Prior Publication Data

US 2015/0287405 A1 Oct. 8, 2015

(51) Int. Cl.
*G10L 15/18* (2013.01)
*G10L 15/06* (2013.01)
*G10L 15/00* (2013.01)

(52) U.S. Cl.
CPC ............ *G10L 15/18* (2013.01); *G10L 15/063* (2013.01); *G10L 15/005* (2013.01)

(58) Field of Classification Search
CPC ..... G10L 13/086; G10L 15/005; G10L 15/08; G10L 15/063; G10L 15/1807
USPC ......................... 704/235, 236, 243, 257, 258
See application file for complete search history.

(56) References Cited

U.S. PATENT DOCUMENTS

| | | | |
|---|---|---|---|
| 5,033,087 A | 7/1991 | Bahl et al. | |
| 5,636,325 A * | 6/1997 | Farrett | G10L 13/10 704/231 |
| 5,806,033 A | 9/1998 | Lyberg | |
| 5,865,626 A * | 2/1999 | Beattie | G09B 19/04 434/185 |
| 6,275,789 B1 | 8/2001 | Moser et al. | |
| 6,366,882 B1 * | 4/2002 | Bijl | G06F 3/16 704/231 |
| 6,434,520 B1 | 8/2002 | Kanevsky et al. | |
| 7,069,513 B2 | 6/2006 | Damiba | |
| 7,353,174 B2 | 4/2008 | Menendez-Pidal et al. | |
| 8,374,865 B1 * | 2/2013 | Biadsy | G10L 15/183 704/243 |

(Continued)

OTHER PUBLICATIONS

Biadsy, F., et al. "Dialect Recognition Using a Phone-GMM-Supervector-Based SVM Kernel" Purportedly presented on Sep. 28, 2010, published Oct. 14, 2010. (28 Pages).

(Continued)

*Primary Examiner* — Douglas Godbold
*Assistant Examiner* — Mark Villena
(74) *Attorney, Agent, or Firm* — Tutunjian & Bitetto, P.C.; Daniel P. Morris (57) ABSTRACT

Methods and systems for automatic speech recognition and methods and systems for training acoustic language models are disclosed. In accordance with one automatic speech recognition method, an acoustic input data set is analyzed to identify portions of the input data set that conform to a general language and to identify portions of the input data set that conform to at least one dialect of the general language. In addition, a general language model and at least one dialect language model is applied to the input data set to perform speech recognition by dynamically selecting between the models in accordance with each of the identified portions. Further, speech recognition results obtained in accordance with the application of the models is output.

20 Claims, 4 Drawing Sheets

(56) References Cited

U.S. PATENT DOCUMENTS

| | | | | |
|---|---|---|---|---|
| 8,788,266 | B2* | 7/2014 | Kitade | G10L 15/197 |
| | | | | 704/10 |
| 2002/0087315 | A1* | 7/2002 | Lee | G06Q 30/06 |
| | | | | 704/9 |
| 2002/0161580 | A1 | 10/2002 | Taylor et al. | |
| 2003/0040909 | A1 | 2/2003 | Ghali | |
| 2003/0191639 | A1* | 10/2003 | Mazza | G10L 15/183 |
| | | | | 704/231 |
| 2004/0073425 | A1* | 4/2004 | Das | G10L 15/187 |
| | | | | 704/236 |
| 2004/0215456 | A1 | 10/2004 | Taylor et al. | |
| 2007/0033039 | A1 | 2/2007 | Taylor et al. | |
| 2007/0124147 | A1* | 5/2007 | Gopinath | G10L 15/19 |
| | | | | 704/257 |
| 2007/0250318 | A1* | 10/2007 | Waserblat | G10L 15/14 |
| | | | | 704/236 |
| 2007/0299666 | A1 | 12/2007 | Li et al. | |
| 2008/0027725 | A1* | 1/2008 | Chu | G10L 17/26 |
| | | | | 704/257 |
| 2008/0147404 | A1* | 6/2008 | Liu | G10L 17/26 |
| | | | | 704/256.2 |
| 2009/0157382 | A1 | 6/2009 | Bar | |
| 2010/0121640 | A1* | 5/2010 | Zheng | G10L 15/187 |
| | | | | 704/240 |
| 2010/0145707 | A1* | 6/2010 | Ljolje | G10L 15/187 |
| | | | | 704/267 |
| 2010/0179803 | A1* | 7/2010 | Sawaf | G06F 17/28 |
| | | | | 704/2 |
| 2010/0223056 | A1* | 9/2010 | Kadirkamanathan | G10L 15/02 |
| | | | | 704/235 |
| 2010/0312560 | A1 | 12/2010 | Ljolje et al. | |
| 2011/0035219 | A1 | 2/2011 | Kadirkamanathan et al. | |
| 2011/0119051 | A1* | 5/2011 | Li | G10L 15/065 |
| | | | | 704/10 |
| 2011/0137636 | A1 | 6/2011 | Srihari et al. | |
| 2011/0202334 | A1 | 8/2011 | Abir | |
| 2011/0295590 | A1 | 12/2011 | Lloyd et al. | |
| 2012/0016671 | A1* | 1/2012 | Jaggi | G10L 15/22 |
| | | | | 704/235 |
| 2012/0022869 | A1 | 1/2012 | Lloyd et al. | |
| 2012/0035915 | A1* | 2/2012 | Kitade | G10L 15/197 |
| | | | | 704/9 |
| 2012/0065975 | A1* | 3/2012 | Ljolje | G10L 15/187 |
| | | | | 704/254 |
| 2012/0109649 | A1* | 5/2012 | Talwar | G10L 15/08 |
| | | | | 704/236 |
| 2012/0143605 | A1* | 6/2012 | Thorsen | G10L 15/183 |
| | | | | 704/235 |
| 2012/0232901 | A1* | 9/2012 | Kadirkamanathan | G10L 15/187 |
| | | | | 704/240 |
| 2013/0166296 | A1* | 6/2013 | Scheffer | G10L 17/02 |
| | | | | 704/243 |
| 2013/0238332 | A1* | 9/2013 | Chen | G10L 15/183 |
| | | | | 704/240 |
| 2013/0332158 | A1* | 12/2013 | Corfield | G10L 15/07 |
| | | | | 704/235 |

OTHER PUBLICATIONS

Campbell W.V., et al. "SVM Based Speaker Verification using a GMM Supervector Kernel and NAP Variability Compensation" 2006 IEEE Conference on Acoustics, Speech and Signal Processing. May 2006. pp. I-97-I-100.

Torres-Carrasquillo, P.A., et al. "Dialect Identification Using Gaussian Mixture Models" Proceedings of the Speaker and Language Recognition Workshop. May 2004. (4 Pages).

Torres-Carrasquillo, P.A., et al. "Eigen-Channel Compensation and Discriminatively Trained Gaussian Mixture Models for Dialect and Accent Recognition" Interspeech. Sep. 2008. (4 Pages).

Office Action dated Feb. 12, 2013 for U.S. Appl. No. 13/557,983. (28 Pages).

Bach, N., et al. "Handling OOV Words in Arabic ASR via Flexible Morphological Constraints" Interspeech. Aug. 2007. pp. 2373-2376.

Biadsy, F. "Automatic Dialect and Accent Recognition and Its Application to Speech Recognition" Columbia University. Mar. 2011. (190 Pages).

Biadsy, F., et al. "Dialect and Accent Recognition Using Phonetic-Segmentation Supervectors" 12th Annual Conference of the International Speech Communication Association. Aug. 2011. pp. 1-4.

Biadsy, F., et al. "Dialect Recognition Using a Phone-GMM-Supervector-Based SVM Kernel" 11th Annual conference of the International Speech Communication Association. Sep. 2010. (4 Pages).

Biadsy, F., et al. "Improving the Arabic Pronunciation Dictionary for Phone and Word Recognition With Linguistically-Based Pronunciation Rules" Human Language Technologies, Proceedings of The Annual Conference of the North American Chapter of the ACL. Jun. 2009. pp. 397-405.

Biadsy, F., et al. "Intoxication Detection Using Phonetic, Phonotactic and Prosodic Cues" 12th Annual Conference of the International Speech Communication Association. Aug. 2011. pp. 3209-3212.

Biadsy, F., et al. "Spoken Arabic Dialect Identification Using Phonotactic Modeling" Proceedings of EACL 2009 Workshop on Computational Approaches to Semitic Languages. May 2009. (9 Pages).

Buckwalter, T., "Issues in Arabic Orthography and Morphology Analysis" Mar. 2004. (4 Pages).

Campbell, D.E. et al., "Support Vector Machines Using GMM Supervectors for Speaker Verification" IEEE Signal Processing Letters. vol. 13, No. 5. May 2006. pp. 308-311.

Campbell, W., et al. "SVM Based Speaker Verification Using a GMM Supervector Kernel and NAP Variability Compensation" IEEE International Conference on Acoustics, Speech and Signal Processing. May 2006. pp. I-97-I-98.

Chen, S.F., et al. "An Empirical Study of Smoothing Techniques for Language Modeling" Tech. Rep. TR-10-98. Harvard University. Aug. 1998.

Habash, N. et al., "Arabic Tokenization, Part-of-Speech Tagging and Morphological Disambiguation in One Fell Swoop" Proceedings of the 43rd Annual Meeting of the Association for Computational Linguistic (ACL '05). Jun. 2005. pp. 573-580.

Kingsbury, B., et al. "The IBM 2009 Gale Arabic Speech Transcription System" IEEE International Conference on Acoustics Speech and Signal Processing (ICASSP). May 2011. pp. 4672-4675.

Kirchhoff, K., et al. "Cross-Dialectal Acoustic Data Sharing for Arabic Speech Recognition" International Conference on Acoustics,Speech, and Signal Processing (ICASSP). vol. 1. May 2004. pp. 765-768.

Mangu, L., et al. "The IBM 2011 Gale Arabic Speech Transcription System" IEEE Workshop on Automatic Speech Recognition and Understanding (ASRU). Dec. 2011. pp. 272-277.

Paul, M., et al. "Word Segmentation for Dialect Translation" Proceedings of the 12th International Conference on Computational Linguistics and Intelligent Text Processing. vol. Part II. Feb. 2011. pp. 55-67.

Rambow, O., et al. "Parsing Arabic Dialects" Johns Hopkins University Summer Workshop. Aug. 2005. (165 Pages).

Reynolds, D.A., et al., "Speaker Verification Using Adapted Gaussian Mixture Models" Digital Signal Processing. 2000. pp. 19-41.

Sawaf, H. "Arabic Dialect Handling in Hybrid Machine Translation" Proceedings of the AMTA. Nov. 2010. (8 Pages).

Soltau, H., et al. "Advances in Arabic Speech Transcription at IBM Under the DARPA Gale Program" IEEE Transactions on Audio, Speech, and Language Processing, vol. 17, Issue 5. Jul. 2009. pp. 884-894.

Soltau, H., et al. "The IBM Attila Speech Recognition Toolkit". Proceedings IEEE Workshop on Spoken language Technology. Dec. 2010. (6 Pages).

Soltau, H., et al. "The IBM 2006 Gale Arabic ASR System" IEEE International Conference on Acoustics, Speech and Signal Processing (ICASSP), vol. 4. Apr. 2007. (4 Pages).

(56) References Cited

OTHER PUBLICATIONS

Vergyri, K., et al. "Development of a Conventional Telephone Speech Recognizer for Levantine Arabic" International Speech Communication Association. Sep. 2005. pp. 1613-1616.

\* cited by examiner

DIALECT-SPECIFIC ACOUSTIC LANGUAGE MODELING AND SPEECH RECOGNITION

GOVERNMENT RIGHTS

This invention was made with Government support under Contract No.: HR0011-06-2-0001 (awarded by the Defense Advanced Research Projects Agency (DARPA)). The Government has certain rights in this invention.

BACKGROUND

Technical Field

The present invention relates to automatic speech recognition, and, more particularly, to automatic speech recognition systems and methods and dialect language model training.

Description of the Related Art

An important aspect of automatic speech recognition (ASR) systems is the ability to distinguish between dialects in order to properly identify and recognize speech in acoustic data. However, current solutions train ASR systems using all available acoustic data, regardless of the type of accent or dialect employed by the speaker. With regard to Arabic speech recognition in particular, most recent work has focused on recognizing Modern Standard Arabic (MSA). The problem of recognizing dialectal Arabic has not been adequately addressed. Arabic dialects differ from MSA and each other morphologically, lexically, syntactically, phonologically and, indeed, in many dimensions of the linguistic spectrum.

SUMMARY

One embodiment is directed to a method for training acoustic models for automatic speech recognition. The method includes building a dialect recognition system that is configured to identify at least one dialect of a general language in input data by distinguishing phones of the general language and the dialect(s). The dialect recognition system is applied to identify portions of an acoustic training data set that conform to the one or more dialects based on distinguished phones of the dialect(s) in the training data set. Further, at least one dialect language model is trained for automatic speech recognition based on the portions of the acoustic training data set that are identified as conforming to the dialect(s).

An alternative embodiment is directed to a method for automatic speech recognition. In accordance with the method, an acoustic input data set is analyzed to identify portions of the input data set that conform to a general language and to identify portions of the input data set that conform to at least one dialect of the general language. In addition, a general language model and at least one dialect language model is applied to the input data set to perform speech recognition by dynamically selecting between the models in accordance with each of the identified portions. Further, speech recognition results obtained in accordance with the application of the models is output.

Another embodiment is also directed to a method for automatic speech recognition. In accordance with this method, an acoustic input data set is analyzed to compute probabilities that portions of the input data set conform to a general language and probabilities that the portions of the input data set conform to at least one dialect of the general language. A general language model and at least one dialect language model is applied to the input data set to perform speech recognition by weighting the models in accordance with each of the computed probabilities. Further, speech recognition results obtained in accordance with the application of the models is output.

Another embodiment is directed to a system for training acoustic models for automatic speech recognition. The system includes a dialect recognition unit and a controller. The dialect recognition unit is configured to distinguish phones of a general language and at least one dialect for the language and to identify portions of an acoustic training data set that conform to the one or more dialects based on distinguished phones of the dialect(s). In addition, the controller is configured to train at least one dialect language model for automatic speech recognition based on the portions of the acoustic training data set that are identified as conforming to the dialect(s).

An alternative embodiment is directed to a system for automatic speech recognition. The system includes a dialect recognition unit and a controller. The dialect recognition unit is configured to analyze acoustic input data to identify portions of the acoustic input data that conform to a general language and to identify portions of the acoustic input data that conform to at least one dialect of the general language. In addition, the controller is configured to apply a general language model and at least one dialect language model to the input data to perform speech recognition by dynamically selecting between the models in accordance with each of the identified portions.

Another embodiment is directed to a system for automatic speech recognition. The system includes a dialect recognition unit and a controller. The dialect recognition unit is configured to analyze acoustic input data to compute probabilities that portions of the input data conform to a general language and probabilities that the portions of the input data conform to at least one dialect of the general language. Further, the controller is configured to apply a general language model and at least one dialect language model to the input data to perform speech recognition by weighting the models in accordance with each of the computed probabilities.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Prior to discussing exemplary embodiments in detail, it is noted that a problem with current ASR systems is that they generally perform poorly on acoustic data that conforms to different dialects. One of the main reasons for the poor performance is the lack of specific training data for the different dialects. With respect to Arabic dialects in particular, the problem is especially challenging due to the lack of a well-defined spelling system and resources, such as acoustic and language model (LM) training data, and the lack of tools, such as morphological analyzers and disambiguation tools. In addition, another problem with current ASR systems is that all available data is used to train language models of such systems, regardless of the type of dialect(s) to which the training data conforms. Due to the large variations in pronunciations and lexicons, these models do not perform well on dialect data.

Embodiments of the present principles are directed to ASR systems and methods that can recognize speech that conforms to different dialects. The general principles described herein can be employed to address dialects of any language, including Arabic dialects. In accordance with one exemplary aspect, a dialect recognition system is trained on a small amount of dialect annotated data. Optionally, after annotating the entire training set using this initial dialect recognition system, the dialect recognition system can be refined. In either case, the dialect recognition system can be employed to find relevant subsets of training data that conform to one or more dialects. According to one aspect, the relevant subsets can be identified by distinguishing phones of a general language and one or more dialects of the language. Furthermore, these subsets can be used for training dialect-specific acoustic and language models. As discussed in more detail herein below, it can be shown that this procedure significantly reduces word error rates on the dialect data.

Another advantage of embodiments described herein is that they have the ability to dynamically and automatically switch between the dialect and general purpose models while performing automatic speech recognition. In particular, both types of models can be employed to recognize speech in a data set including different dialects in one decoding pass. In addition, in accordance with one exemplary implementation, both general language models and one or more dialect language models can be applied simultaneously. Here, the models can be weighted in accordance with probability parameters that are computed by the dialect recognition system and are determined by distinguishing phones of the dialect(s) and the general language.

In exemplary embodiments developed for Arabic dialects, an ASR system that can recognize Levantine dialects as well as MSA was constructed by building Levantine/MSA-specific models. To build the models, an automatic dialect recognition system was employed to annotate acoustic data with dialect IDs. In one example, the acoustic data was obtained from the Global Autonomous Language Exploitation Program (GALE). The acoustic training data consists of 1800 hours of broadcast news and conversations. Here, the system was utilized to automatically identify Levantine and MSA subsets in mixed speech of a variety of dialects, including MSA. A significant reduction in word error rate was achieved by training separate models on the corresponding subsets identified by the dialect recognition system, as opposed to using the entire data set to train one system for both dialects. During decoding, a tree array structure can be used to mix Levantine and MSA models automatically by employing the posterior probabilities of the dialect classifier as soft weights. This technique permits the combination of these models without sacrificing performance for either of the models.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with one exemplary embodiment, the present principles can be employed to generate dialect-specific language models that can be used for automatic speech recognition. For example, for Arabic, a Levantine-specific model can be built using available GALE data. This data contains a mix of dialects in addition to MSA and has no specific dialect annotations. To build a Levantine-specific ASR system, dialect annotations should be made for each utterance, as Arabic speakers, for example, in broadcast conversations (BC), tend to code mix/switch between MSA and their native dialects across utterances and even within the same utterance. Although code switching points may be identified, for simplicity purposes, an utterance can be assumed to be spoken either in MSA or in purely a regional dialect. As discussed herein below, a dialect recognition system can be built to identify dialects at the utterance level. A dialect recognition approach that employs the hypothesis that certain phones are realized differently across dialects can achieve excellent performance for multiple dialect and accent tasks (including Arabic). This approach can be used to annotate acoustic training and input data, as described herein below.

Figure 1:
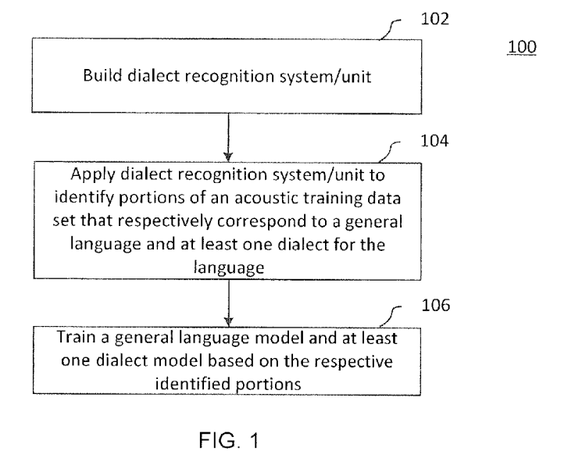
FIG. 1 is a high-level flow diagram of a method for training acoustic models for automatic speech recognition in accordance with exemplary embodiments of the present principles.

Referring now to the drawings in which like numerals represent the same or similar elements and initially to FIG. 1, an exemplary method 100 for building language models for use in automatic speech recognition is illustratively depicted. It should be noted that the present principles can employ a variety of acoustic models. For example, such acoustic models include unvowelized models, buckwalter vowalized models and MADA vowelized models. For Arabic applications, different pronunciation modeling approaches can be employed.

With regard to unvowelized modeling, letter-to-sound mapping is utilized, while short vowels and other diacritic markers are ignored. Although these models do not generally perform as well as vowelized models at the maximum likelihood (ML) level, discriminative training reduces the gap to a very large extent. Buckwalter vowelized modeling uses the Buckwalter morphological analyzer to generate candidates of vowelized (diacritized) pronunciations in a context-independent way. This modeling also employs letter-to-sound mapping, but each letter and diacritic marker (except for shadda marker, where consonants are doubled) is mapped to a phoneme. On average there are 3.3 pronunciations per words. For decoding, pronunciation probabilities that are obtained from the training data are used. Morphological analysis and disambiguation (MADA) Vowelized modeling provides an alternative to Buckwalter. Here, MADA is used to generate context-dependent diacritized candidates. In this approach, 15 linguistically-motivated pronunciation rules for Arabic are applied to map diacritized words to true phonemes. On average there are 2.7 pronunciations per word. Pronunciation probabilities can be derived from the MADA output.

The acoustic models described here are based on context expanded Perceptual Linear Prediction (PLP) features with cepstral mean and variance normalization (CMVN) plus Linear Discriminant Analysis (LDA) and Semi-tied Covariance (STC). Speaker adaptation includes Vocal Tract Length Normalization (VTLN) regression trees, Feature space Maximum Likelihood Linear Regression (FMLLR) trees, and Maximum Likelihood Linear Regression (MLLR) trees. Discriminative training uses both Feature space Boosted Maximum Mutual Information (fBMMI) and model space Boosted Maximum Mutual Information (BMMI) training. In particular examples described herein, a 795K word vocabulary, which has out of vocabulary (OOV) rates of less than 1% for all the GALE test sets, was used. The language model employed is an unpruned 4-gram with 913M n-grams.

The method 100 can begin at step 102, at which a dialect recognition system or unit can be built. In accordance with one exemplary embodiment, a dialect recognition system 200 depicted in FIG. 2 can be built at step 102, for example, by a controller 201, using training data 202. The system or unit 200 includes a phone decoder 204 and a kernel module 212. The dialect recognition 200 employs phone hypotheses described above. The phone decoder can include a phone recognizer 205, which can be a triphone context dependent (CD)-phone recognizer, to identify phones in the training data 202. In one embodiment, the phone recognizer 205 was trained on MSA using 50 h of GALE speech data of broadcast news and conversations with a total of 20,000 Gaussians. In this embodiment, the phone recognizer 205 uses one acoustic model for silence, one acoustic model for non-vocal noise and another acoustic model for vocal noise. The phone recognizer 205, in the embodiment, is a 13-dimensional PLP front-end with CMVN. Each frame is spliced together with four preceding and four succeeding frames and then LDA is performed to yield 40$d$ feature vectors. For Arabic, a unigram phone model trained on MSA can be used to avoid bias for any particular dialect. True phonetic labels can be used here by generating pronunciation dictionaries using MADA. FMLLR adaptation can also be utilized in accordance with the top CD-phone sequence hypothesis. In one embodiment, the phone inventory employed by the phone recognizer includes 34 phones, 6 vowels and 28 consonants.

Figure 2:
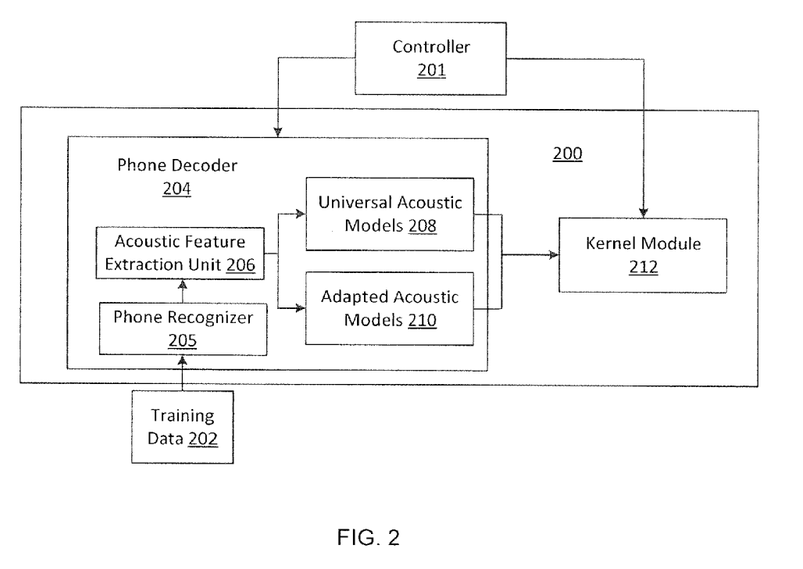
FIG. 2 is a high-level block diagram depicting a dialect recognition system in accordance with exemplary embodiments of the present principles.

The dialect recognition system 200 built in accordance with step 102 can be configured to identify one or more dialects of a general language in input data by distinguishing phones of the general language and the dialect(s). For example, to build the phone decoder 204, the controller 201 can build a 'universal' acoustic model 208 for each context-independent phone type and one or more adapted acoustic models 210 for one or more corresponding dialects for each context-independent phone type. For example, the models 208 can be general phone representations for the general language and the models 210 can be phone representations for one or more dialects. The controller 201 can construct the models 210 by adapting the general phone representations, as discussed in further detail herein below.

To build the models 208, an acoustic feature extraction unit 206 can be employed to extract acoustic features aligned to each phone instance in the training data 202. In the example noted above, the features would include 40 d feature vectors after CMVN and FMLLR. As also noted above, the training data 202 can include a mix of dialects. After extracting the feature data, the controller 201 can train the universal acoustic models 208 using the frames aligned to the same phone type (in all training utterances). For example, each of the models 208 can be a Gaussian Mixture Model (GMM), with 100 Gaussian components with diagonal covariance matrices, for the corresponding phone type, and can be trained by employing the Expectation Maximization (EM) algorithm. Accordingly, in the embodiment described above in which the phone recognizer 205 employs an inventory including 34 phones, 34 GMMs 208 are built. Each phone GMM can be viewed as a GMM-Universal Background Model (GMM-UBM) for that phone type, as it models the general realization of that phone across dialect classes. These GMMs 208 are denoted phone GMM-UBMs.

In accordance with one exemplary aspect, the controller 201 can employ the universal acoustic models 208 to generate the adapted acoustic models 210, each of which represents a phone type in a given utterance (U) in the training data 202. For example, in one embodiment, each phone type in a given utterance U can be represented as a single Maximum A-Posteriori (MAP) adapted GMM, where each of the MAP adapted GMMs $f_\varphi$ constitute the adapted acoustic models 210. Specifically, the acoustic frames aligned to every phone instance of the same phone type in U is obtained. Then these frames are used to MAP adapt the means of the corresponding phone GMM-UBM using a relevance factor of r=0.1. The resulting GMM of phone type $\varphi$ is denoted as the adapted phone-GMM ($f_\varphi$). The intuition here is that $f_\varphi$ 'summarizes' the variable number of acoustic frames of all the phone instances of a phone-type $\varphi$ in a new distribution specific to $\varphi$ in U.

The controller 201 can use the models 210 and 208 to build a kernel module 212 that can be employed to identify the dialect of a portion of input data, such as an utterance. The kernel applied by the kernel module 212 can be a phone-type-based Support Vector Machine (SVM) Kernel. For example, the support vector machine classifier can be based on kernel values determined for different pairs of dialects of the general language. For example, each utterance U can be represented as a set $S_U$ of adapted phone-GMMs, each of which corresponds to one phone type. Therefore, the size of $S_U$ is at most the size of the phone inventory ($|\Phi|$). Let $S_{U_a}=\{f_\varphi\}_{\varphi\in\Phi}$ and $S_{U_b}=\{g_\varphi\}_{\varphi\in\Phi}$ be the adapted phone-GMM sets of utterances $U_a$ and $U_b$, respectively. Using the kernel function in equation (1), which employs the upper bound of KL-divergence-based kernel (2), a binary SVM classifier can be trained for each pair of dialects. This kernel function compares the 'general' realization of the same phone types across a pair of utterances.

$$K(S_{Ua}, S_{Ub}) = \sum_{\phi \in \Phi} K_\phi(f'_\phi, g'_\phi) \quad (1)$$

where $f'_\varphi$ is the same as $f_\varphi$ but we subtract from its Gaussian mean vectors the corresponding Gaussian mean vectors of the phone GMM-UBM (of phone type $\varphi$). $g'_\varphi$ is obtained similarly from $g_\varphi$. The subtraction forces zero contributions from Gaussians that are not affected by the MAP adaptation. And, $$K_\phi(f'_\phi, g'_\phi) = \sum_i \left(\sqrt{\omega_{\phi,i}} \Sigma_{\phi,i}^{-\frac{1}{2}} \mu_i^f\right)^T \left(\sqrt{\omega_{\phi,i}} \Sigma_{\phi,i}^{-\frac{1}{2}} \mu_i^g\right) \quad (2)$$

where $\omega_{\varphi,i}$ and $\Sigma_{\varphi,i}$ respectively are the weight and diagonal covariance matrix of Gaussian i of the phone GMM-UBM of phone-type $\varphi$; $\mu_i^f$ and $\mu_i^g$ are the mean vectors of Gaussian i of the adapted phone-GMMs $f_\varphi$ and $g_\varphi$, respectively.

It is interesting to note that, for (1), when $K_\varphi$ is a linear kernel, such as the one in (2), each utterance Su, can be represented as a single vector. This vector, say $W_x$, is formed by stacking the mean vectors of the adapted phone-GMM (after scaling by $$\sqrt{\omega_\phi} \Sigma_\phi^{-\frac{1}{2}}$$

and subtracting the corresponding $\mu_\varphi$) in some (arbitrary) fixed order, and zero mean vectors for phone types not in $U_x$. This representation allows the kernel in (1) to be written as in (3). This vector representation can be viewed as the 'phonetic finger print' of the speaker. It should be noted that, in this vector, the phones constrain which Gaussians can be affected by the MAP adaptation (allowing comparison under linguistic constraints realized by the phone recognizer), whereas in the GMM-supervector approach, in theory, any Gaussian can be affected by any frame of any phone.

$$K(S_{U_a}, S_{U_b}) = W_a^T W_b \quad (3)$$

Here, the controller 201 can configure the kernel module 212 to compile values of $K(S_{U_a}, S_{U_b})$ for utterances $U_a$ and $U_b$ that are both known to conform to different corresponding dialects. In addition, the controller 201 can configure the kernel module 212 to employ this value of $K(S_{U_a}, S_{U_b})$ as, at least in part, an identifier for the dialects. For example, the kernel function $K(S_{U_a}, S_{U_b})$ computes the "similarity" between a given pair of utterances. During training, for each pair of dialects, the kernel module 212 computes a kernel matrix using the kernel function for each entry in the matrix based on the training utterances of that pair of dialects. For example, to train the system 200 to detect whether a dialect is MSA or Levantine, the controller 201 can direct the kernel module 212 to construct a kernel (pairwise) matrix using all training utterances of MSA and Levantine using the kernel function in (1) and then employ an SVM training tool, such as LibSVM, to find the optimal model parameters (given the matrix) for an SVM model M. During prediction, given an utterance U, the kernel function (1) is used again to compute the "similarity" between U and all support vectors that are obtained after training. For example, the SVM training tool can estimate a posterior probability P(C|U;M), which is the probability that a given utterance u conforms to the class C (i.e., dialect) under the SVM model M. Thus, for each dialect C, a posterior probability can be determined indicating the probability that the utterance conforms to the dialect. In addition, the Kernel module 212 can select the class or dialect C that has the highest probability as the dialect to which the given utterance conforms. It should be noted that the dialect or class C referred to here can also correspond to a general language, such as MSA. In addition, it should be further noted that the dialect classifier is not limited to an SVM. Rather, any other classifier that can find or apply the optimal model parameters based on the kernel can be employed.

In one particular embodiment, the dialect recognition system 200 was trained for Arabic dialects using GALE data. As noted above, the GALE data is not annotated based on dialects. Moreover, to the knowledge of the inventors, there is no Arabic dialect corpus of similar domain and/or acoustic condition as BC. Fortunately, there were telephone conversation corpora available from the Linguistic Data Consortium (LDC) for four Arabic dialects: Egyptian, Levantine, Gulf, and Iraqi. To address the acoustic recording and domain issues, two systems were built.

In the first system, dialect recognition was trained on dialect data taken from spontaneous telephone conversations from the following Appen corpora: Iraqi Arabic (478 speakers), Gulf (976), and Levantine (985). For Egyptian, the 280 speakers in CallHome Egyptian and its supplement were used. The system was trained on 30 s cuts. Each cut consisted of consecutive speech segments totaling 30 s in length (after removing silence). Multiple cuts were extracted from each speaker.

This system was run to annotate a portion of the GALE BC data (after downsampling to 8 Khz). The dialect recognition system classified 54 h of Levantine speech with a relatively high confidence. Since the dialect ID system is trained on telephone conversations as opposed to broadcast conversations, the LDC had validated/filtered the output of the system. About 36 h out of 54 h were tagged as "mostly Levantine," a 10 h set was tagged as containing code switching between MSA and Levantine at the utterance level, and an 8 h set was tagged as containing either other dialects or MSA. The first system in this example was not trained to identify MSA.

A 4 h test set (LEV_4 h) was extracted to be used for reporting results in Levantine ASR experiments. From the remaining 32 h, all the utterances longer than 20 seconds were extracted, which yields approximately 10 h of data (LEV_10). Part of the transcripts released by LDC for the GALE program have "non-MSA" annotations. This permits the selection of a 40 h MSA corpus by choosing speakers whose utterances have no such markings. From this set, 4 h were selected for MSA ASR experiments (MSA_4 h). From the remining, a 10 h set with utterances longer than 20 seconds (MSA_10) was selected.

Given that reliable test data for BC MSA and Levantine had been obtained (MSA_10 and LEV_10), the second dialect recognition system was trained to distinguish MSA vs. Levantine for BC acoustic conditions. LEV_10 was divided into 9 h for training and 1 h for testing the dialect recognition system and for making refinements to the dialect recognition system. Similarly MSA_10 was divided into 9 h for training and 1 h for testing. Note that this amount of acoustic data is typically not sufficient to train dialect identification systems; however, it was desirable to use the rest of the data for other experiments.

As described above, for the dialect identification system 200, a phone decoder 204 and kernel module 212 should be constructed. Therefore, a number of experiments for finding the best strategy for building the phone decoder 204 and kernel module 212 was carried out. Three MADA Vowelized (i.e., a true phonetic-based system) triphone acoustic models were trained by varying the number of Gaussians and the number of states, using either ML or discriminative training. First, these models were tested for word recognition with the unpruned 4-gram LM mentioned above. Table I, below, shows the word error rate(s) (WER) on the DEV-07 set. DEV-07 is a test set defined by the LDC and is a standard development set in GALE.

TABLE I

| MADA Acoustic Model (AM) Used for Dialect ID, WER Test | |
|---|---|
| System | WER on DEV-07 |
| 50k Gaussians, 1k states, ML | 16.8% |
| 200k Gaussians, 5k states, ML | 15.4% |
| 200k Gaussians, 5k states, fBMMI + BMMI | 12.5% |

In the next test, the triphone models were used to decode phone sequences with different phone language models. For each phone decoder and recognition system, a dialect classification system using the SVM-Kernel approach described above was employed. The models were trained on 9 h of Levantine data and 9 h of MSA data, and the results were evaluated on a test set which contains 1 h of Levantine and 1 h of MSA data. Table II, below, shows the dialect classification rates for the different acoustic model and phone language model combinations. Based on these results, the smallest, simplest model (50K Gaussians ML model with unigram phone language model) was selected for further evaluation.

TABLE II

Dialect Classification Performance

| System/Features | Classification Accuracy |
| --- | --- |
| 50k ML 1-gram phone LM | 85.1% |
| 50k ML 3-gram phone LM | 84.5% |
| 200k ML, 3-gram phone LM | 84.9% |
| 200k fBMMI + BMMI, 3-gram | 83.0% |

Vowelizations were also compared. For example, a 300 hour subset from the entire GALE training set was selected and speaker adaptive acoustic models were trained for all three lexical setups. The decoding setup includes VTLN, FMLLR, and MLLR and an unpruned 4-gram LM with a 795 k vocabulary was used. First, the models were tested on the standard GALE development set DEV-07, as shown in below in Table III. Buckwalter and MADA vowelizations performed similarly, while the unvowelized models were 2.7% worse at the ML level. However, it should be noted that the difference is only 1% after discriminative training. This indicates that discriminative training of context-dependent (CD) GMM models is able to compensate for the lack of (knowledge-based) pronunciation modeling to a large degree.

TABLE III

300 H AM Tested on DEV-07

| System | Unvowelized | BW Vowelized | MADA Vowelized |
| --- | --- | --- | --- |
| ML | 16.6% | 14.2% | 13.9% |
| fBMMI + BMMI | 12.7% | 11.8% | 11.7% |

In the next comparison, the models were tested on a newly defined MSA test set. The reason behind this set is that it is desirable to use the same methodology for defining/selecting a test set for both Levantine and MSA. In particular, it is desirable to analyze the difficulty of detecting the Levantine dialect when compared to MSA under the same conditions. Essentially, this methodology reduces the effects related to how and from where the test sets are chosen. DEV-07, for example, is a test set defined by LDC and consists of mostly very clean broadcast news data. This is very likely the reason behind the very low error rates for this set. The MSA_4 h test set is selected randomly from broadcast conversations of the training set and labeled as MSA by the dialect classifier. The reason to select the data from broadcast conversations is to match the conditions of the Levantine test set. All of the Levantine data is taken from BC as well. The error rates on this MSA test set, as shown in Table IV below, is almost twice as high as the error rates on DEV-07, as shown in Table III above, although both are non-dialectal (MSA) test data. Further, all three models perform at a similar level (21.2%-21.8%) after discriminative training.

TABLE IV

300 H AM Tested on MSA_4h

| System | Unvowelized | BW Vowelized | MADA Vowelized |
| --- | --- | --- | --- |
| ML | 28.6% | 27.0% | 25.7% |
| fBMMI + BMMI | 21.8% | 21.7% | 21.2% |

The models were also compared with Levantine data (LEV_4). Table V, below, provides the results of this test.

TABLE V

300 H AM Tested on LEV_4h

| System | Unvowelized | BW Vowelized | MADA Vowelized |
| --- | --- | --- | --- |
| ML | 48.2% | 50.3% | 48.1% |
| fBMMI + BMMI | 39.7% | 42.1% | 40.8% |

Recall that this Levantine test set is part of the GALE corpus identified automatically by the dialect recognition system 200 and manually verified by LDC. The same methodology for selecting the test data is used for MSA_4 h and LEV_4 h. Both MSA_4 h and LEV_4 h test sets are excluded from the training of the acoustic and language models. From Tables IV and V, above, two main points are observed.

First, the error rate for Levantine is almost twice as high as for MSA (39.7% vs 21.8%). The Levantine error rate here is compared to MSA_4 h and not to DEV-07. This permits us to attribute the increase in error rate to dialect and not to other effects, such as how the test set was chosen and how carefully the transcripts were prepared.

Second, another interesting observation is that the unvowelized models perform best on Levantine (39.4% vs. 40.8% and 42.1%). It is speculated that this is due to the fact that the Buckwalter analyzer, MADA, and the pronunciation rules are designed for MSA—which do not work properly for Levantine words. A dialect specific morphological analyzer would very likely improve results, but it is unclear that it would significantly reduce the error rate on Levantine given that the unvowelized model perform comparably well on MSA data (Table IV).

Referring again to FIG. 1, at step 104, the dialect recognition system or unit 200 can be applied to an acoustic training data set to identify portions of the set that conform to one or more dialects based on distinguished phones of the dialects. For example, the unit 200 can employ the kernel module 212 as discussed above to identify portions that conform to one or more dialects. In addition, the unit 200 can also employ the kernel module 212 to identify portions of the acoustic training data set that conform to the general language. For example, as illustrated in the system 300 of FIG. 3, the system or unit 200 can parse acoustic training data 302 into general language portions 306 and a set of dialect portions 308, which can, for example, correspond to one or more dialects. For example, portions 308-1 can correspond to a first dialect, portions 308-n can correspond to an nth dialect, etc. As noted above, the identification can be made on the utterance level such that each portion is a respective utterance in the training data set.

Figure 3:
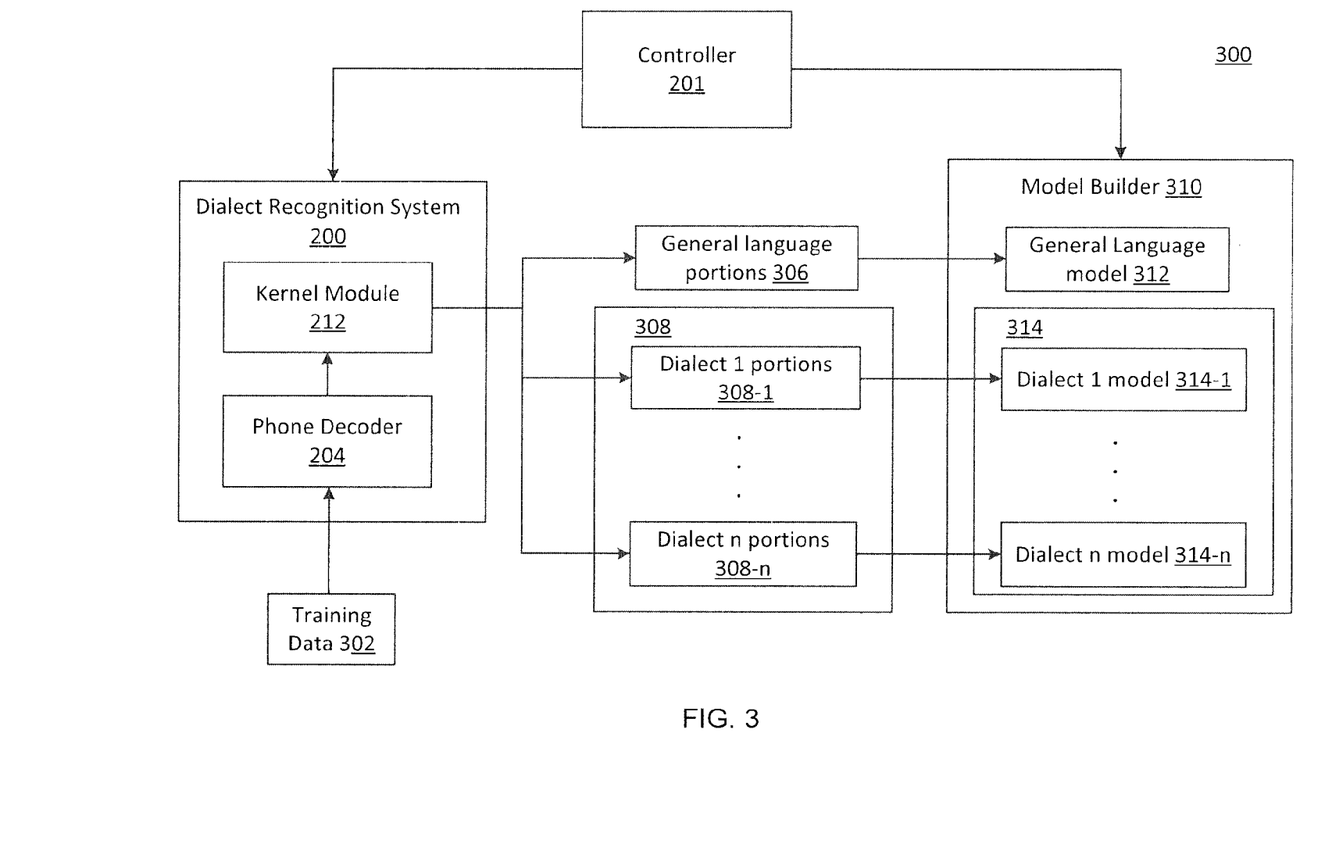
FIG. 3 is a high-level block diagram of a system for training acoustic models for automatic speech recognition in accordance with exemplary embodiments of the present principles.

At step 106, the controller 201 can train one or more dialect language models for automatic speech recognition based on the portions of the acoustic training data set that are identified as conforming to the respective one or more dialects. For example, the controller 201 can train a set of dialect acoustic models 314 with the set of identified portions 308. For example, a model 314-1 for the first dialect can be trained on dialect portions 308-1, a model 314-n for the nth dialect can be trained on dialect portions 308-n, etc. In addition, the controller 201 can also train a general language model for automatic speech recognition based on the portions of the acoustic training data set that are identified as conforming to the general language. For example, the general language acoustic model 312 can be trained on identified general language portions 306. Here, the controller 201 can employ a model builder 310 to build the models 312 and 314.

To illustrate the operation of an embodiment of the system 300, a dialect recognition system 200 was run on 300 hours of the subset of the GALE training corpus. Out of this training set, about 37 hours were labeled as Levantine. This is generally not sufficient to train a set of acoustic models. One option is to use a deep MLLR regression tree or MAP training. MLLR works well for limited domain adaptation data, but will not be able to fully utilize a large amount of domain adaptation data. While MAP works better with more adaptation data, it is generally difficult to use it in combination with feature space discriminative training.

In accordance with one exemplary aspect, to train acoustic language models, posterior probability scores for portions of input data can be employed. For example, at step 104, when the dialect recognition system or unit 200 is applied to the training data set, the system 200 can determine posterior probability scores for each of the utterances indicating a respective probability that the corresponding utterance conforms to the general language and a respective probability that the corresponding utterance conforms to one or more of the dialects. For example, the posterior probability scores can be determined using an SVM training tool, as described above with respect to the kernel module 212.

As such, the controller 201 can train the acoustic models 312 and 314 using weighted statistics. The advantage is that all components of the model (including decision trees) are trained at all training stages (ML, DT) with the new domain data. In accordance with one exemplary aspect, as noted above, additional information in the form of dialect posterior probabilities for each utterance is available from the dialect classifier system 200. The posterior probabilities can be used to weight the statistics of each utterance during ML and discriminative training. In accordance with one example, one or more dialect models can be trained using portions of the acoustic training data set that are identified as conforming to a general language. For example, the controller 201 can weight each utterance with its corresponding posterior probability scores indicating the probability that the utterance conforms to the dialect and the probability that the utterance conforms to the general language. More specifically, training of Acoustic models comprises two steps: 1) accumulating sufficient statistics and 2) performing parameter estimation. The posterior probability scores from the dialect annotator 200 are employed in step 1 to soft-weight the statistics. The formulas for estimating sufficient statistics with a dialect score are $E(x)=\Sigma P(dialect|x)*x$ and $E(x^2)=\Sigma P(dialect|x)*x^2$, where $P(dialect|x)$ is the probability that the utterance x is spoken in a given dialect and where x is the observable data or features. Further, $E(x)$ is the expected value of x and $E(x^2)$ is the expected value of $x^2$.

Table VI, below, illustrates a comparison of different weighting schemes using the 300 hours of the subset of the GALE training corpus as training data 302. In the first row, all 300 hours were used to train a Levantine dialect model regardless of whether the dialect recognition unit 200 classified the data as Levantine data or MSA. This resulted in a word error rate of 48.2%. In the second row, only on the selected Levantine subset of 37 hours was used to train the Levantine dialect model. The error rate is slightly higher, 48.3%, due to the lack of training data. In the third row, the Levantine dialect model was trained with the same 300 hours as the first row. However, here, soft weights were used, where the statistics of each utterance were weighted individually by the posterior score of the dialect classifier 200. This provides a smoothing of the models, avoids overtraining and results in a 2.9% error reduction.

TABLE VI

Comparison of Weighting Schemes of Training Statistics on LEV_4h, 300 h Setup, Unvowelized ML Models

| Training data | WER |
|---|---|
| unweighted (300 h) | 48.2% |
| hard-weighted (37 h) | 48.3% |
| soft-weighted (300 h) | 45.3% |

The soft-weighting scheme described above was applied to all of the voweliza-tion setups and the models were compared after ML and fBMMI+BMMI training in Table VII, below.

TABLE VII

300 H Acoustic Models tested on LEV_4H

| System | Unvowelized | BW Vowelized | MADA Vowelized |
|---|---|---|---|
| ML | 45.3% | 47.3% | 45.5% |
| fBMMI + BMMI | 38.4% | 41.4% | 39.2% |

The improvement from focusing on Levantine training data can be seen by comparing Table V with Table VII. For example, for the unvowelized models, 2.9% absolute error reduction was obtained at the ML level, and 1.3% was obtained after discriminative training. It is noted that training data was not added. Rather, relevant subsets that match the target dialect were found.

Figure 4:
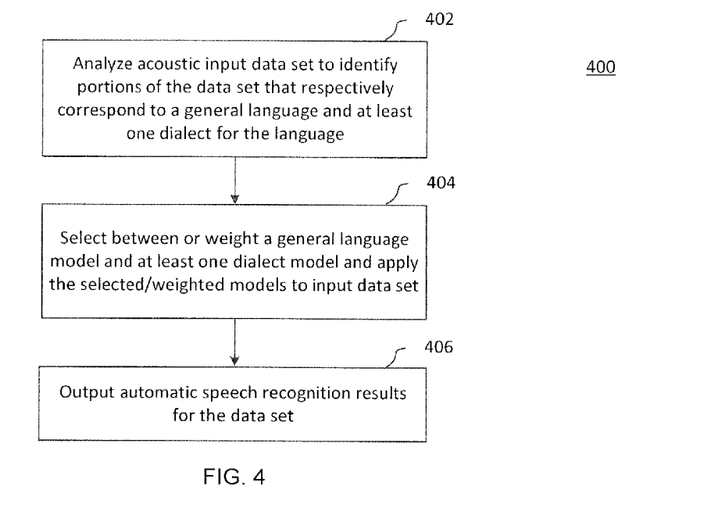
FIG. 4 is a high-level flow diagram of a method for automatic speech recognition in accordance with exemplary embodiments of the present principles.
Figure 5:
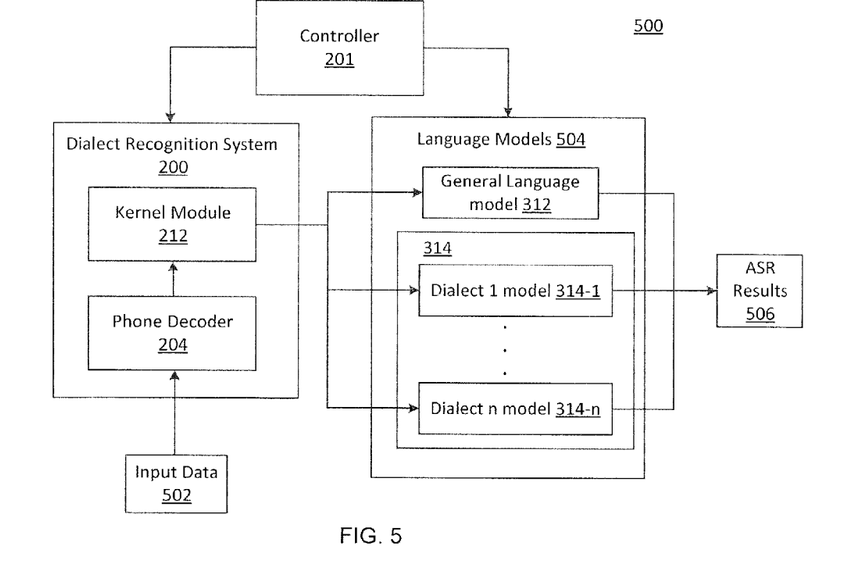
FIG. 5 is high-level block diagram of a system for automatic speech recognition in accordance with exemplary embodiments of the present principles.

With reference now to FIG. 4, an exemplary method 400 for automatic speech recognition is illustratively depicted. In addition, FIG. 5 illustrates an exemplary automatic speech recognition system 500 that can be configured to implement the method 400. The method 400 can begin at step 402, at which a dialect recognition system or unit 200 can analyze an acoustic input data set 502 to identify portions of the input data set that conform to a general language and to identify portions of the input data set that conform to at least one dialect of the general language. For example, the dialect recognition unit 200 can identify and classify utterances as conforming to the general language or to one or more dialects, as discussed above. Here, to implement the identification, the unit 200 can employ the phone decoder 204 and the kernel module 212 to analyze the acoustic input data 502 to compute probabilities that portions of the input data set 502 conform to a general language and probabilities that the portions of the input data set 502 conform to one or more dialects of the general language. For example, the phone decoder 204 can distinguish phones of the general language and the one or more dialects, as described above. For example, the phone decoder 204 can employ general phone representations for the general language and phone representations for the one or more dialects that are constructed by adapting the general phone representations, as discussed above. Further, the kernel module 212 can employ a support vector machine classifier that is based on kernel values for different pairs of dialects of the general language to analyze phones and utterances in the input data set 502, as indicated above.

At step 404, the controller 201 can apply a general language model and at least one dialect language model to the input data set to perform automatic speech recognition by dynamically selecting between the models in accordance with each of the identified portions. The selections can be made per utterance and can be based on posterior probability scores determined by the dialect recognition system 200 at step 402, where the model corresponding to the highest probability score is applied to the utterance. For example, if, of the general language and dialects 1-$n$, the general language has the highest probability score for a given utterance, indicating that the utterance most probably conforms to the general language, the general language model 312 is applied to the utterance and the speech recognition results for the utterance provided by the general language model is output at step 406. In turn, if, of the general language and dialects 1-$n$, dialect 1 has the highest probability score for a given utterance, indicating that the utterance most probably conforms to dialect 1, the dialect 1 language model 314-1 is applied to the utterance and the speech recognition results for the utterance provided by the dialect 1 language model is output at step 406. The dynamic selection of the models in this way enables the system 500 to perform the automatic speech recognition in a single decoding pass, while at the same time applying a plurality of different language models (including one or more dialects) to accurately recognize speech in different utterances of the input data that conform to different dialects.

Alternatively, at step 404, the controller 201 can apply the general language model and at least one dialect language model to the input data set to perform speech recognition by weighting the models in accordance with each of the probabilities determined at step 402 by the dialect recognition unit 200. Here, the models 504 can be combined by combining the different decision trees for each of the models into one single decoding graph that can be applied by the controller 201 to perform automatic speech recognition at step 404. This enables the combination of different acoustic models in one decoding pass on the fly without making a hard model selection. As such, the system 500 can perform the method 400 in one decoding pass. This aspect is significant, as decoding with dialect-specific models is relatively complicated if a statically compiled decoding graph is used. For example, the difficulty stems from the fact that the decision tree contains dynamic questions that can be answered only at run-time, and not when the graph is compiled. Thus, in accordance with a feature of the present principles, the decision tree is separated into two parts: a static part containing only phonetic questions, and a dynamic part for the dialect questions. The decision tree is reordered such that no dynamic question occurs above a static question. The static part of the decision tree can be compiled into a decoding graph, while the dynamic part of the tree is replaced by a set of virtual leaves. The controller 201 of the system 500 maintains a lookup table that transforms each virtual leaf to a corresponding dialect-specific leaf at run-time.

Also at step 404, the controller 201 of the system 500 can further determine a combined acoustic score that is the weighted sum of the log likelihoods of the combined models. In particular, the controller 201, at step 404, can compute, for each of the utterances, a weighted sum of log likelihoods determined in accordance with the general language model and one or more dialect language models. For example, in the combined decision trees described above, the virtual leaves correspond to lookup tables that map virtual leaves to physical Hidden Markov Model (HMM) states at run-time. The decoding graph can now be constructed using the tree with virtual leaves. At run-time, dialect information is available and the combined acoustic score can be computed. This can be implemented through a separate dialect ID tool, through selecting the dialect with the best likelihood, or through other sources of information. For acoustic score computation, the virtual leaves can be mapped to the corresponding physical HMM states. Once the decoding graph is obtained, the controller 201 can use the Viterbi algorithm or the A* algorithm to find the best state sequence and thereby determine the ASR results.

At step 406, the controller 201 can output speech recognition results obtained from the application of the models at step 404.

In accordance with one example, the MSA and LEV unvowelized models described above were combined. The results are provided in Table VIII, below. The first row represents the extreme case in which the MSA model is used exclusively on the input data set and the second row represents the extreme case in which the LEV model is used exclusively on the input data set. In the third row, both models are weighted equally and constantly for all utterances. The error rate on DEV-07 is 13.3%, 0.6% higher than when just using the MSA model, but much better than when using the LEV models only (15.1%). On the other hand, a small improvement is obtained on the Levantine test set (38.4% goes to 38.2%). This is a system combination effect. In the fourth and last row in Table VIII, the posterior of the dialect classifier was used as a soft weight for model combination on a per utterance basis, as described above. This automatic strategy provides an error rate that is close to the optimal performance of a model selected manually.

TABLE VIII

Tree Array Combination of General Models with Levantine Models in One Decoding Pass, 300 H Unvowelized fBMMI + BMMI Setup

| Weight for MSA model | Weight for LEV models | DEV-07 | LEV_4h |
|---|---|---|---|
| 1.0 | 0.0 | 12.7% | 39.7% |
| 0.0 | 1.0 | 15.1% | 38.4% |
| 0.5 | 0.5 | 13.3% | 38.2% |
| Dialect Classifier soft weight | | 12.9% | 38.4% |

It should be noted that, referring again to FIGS. 3 and 4, in accordance with another exemplary aspect, dialect labels can be employed during training of the acoustic models 312 and 314 at step 106 of the training method 300. For example, the full GALE training corpus consists of about 1800 hours. Similar to the previous experiments described above, but now focusing exclusively on the unvowelized models, dialect labels were generated for the entire training corpus. One dialect recognition system 200 embodiment identified about 237 hours (13%) as Levantine in the GALE corpus. In Table IX, below, different weighting schemes are compared for the Levantine data. In contrast to the 300 hours setup of Table VI, the best error rate is now achieved by training exclusively on the 237 hours Levantine data instead of using the dialect scores to weight the statistics. The reason is simply that the amount of Levantine training data is now large enough to train acoustic models and data need not be added, as it was the case for the previous experiments when only 37 hours of Levantine data were available. Thus, although the soft weighting training scheme described above works substantially well for limited training data, a hard weighting scheme may present a better option when a large amount of training data is available.

TABLE IX

Comparison of Weighting Schemes for Model Training
on LEV_4H, 1800 H Setup for Unvowelized ML Models

| Training data | WER |
| --- | --- |
| unweighted (1800 h) | 47.0% |
| hard-weighted (237 h) | 42.3% |
| soft-weighted (1800 h) | 43.5% |

After discriminative training (fBMMI+bMMI) of the 237 hours unvowelized Levantine models, the error rate decreases to 36.3%. In other words, the error rate can be lowered by almost 10% (relative) by focusing on relevant subsets of the training data and the dialect classifier together with the tree array decoding technique, described above with respect to the method 400, which permits the use both Levantine and MSA models in one decoding pass, thereby enabling the system to handle both dialectal and non-dialectal utterances simultaneously.

The previous experiments described above demonstrate that the acoustic training data contains relevant dialect subsets that, when detected, can improve the acoustic models. It should be noted that in accordance with other exemplary aspects of the present principles, a similar strategy for language modeling can be employed for building a dialect classifier based on text only, without the use of audio data. For example, a Kneser-Ney smoothed 3-gram Levantine LM can be built and based on the 2M words corresponding to the transcripts of the 237 hours Levantine acoustic training data, which are identified automatically. Similarly, an MSA language model can be built from all the utterances that are classified as MSA with more than 95% probability by the dialect recognition system. Next, a text dialect classifier, which simply checks the log-likelihood ratio of the two LMs on a given utterance, can be built. Table X, below, illustrates that dialects can determined reliably, even when only text data is available. The text-based dialect classifier can employ discriminative classifiers (such as, logistic regression and SVM) instead of likelihood ratios.

TABLE X

Text Only Dialect Classification Using Levantine and MSA LMs

| Test data | Dialect classification |
| --- | --- |
| MSA_4h | 86.0% |
| Lev_4h | 87.2% |

With regard to the Levantine LM, it should be noted that the language models were trained on a collection of 1.6 billion words, which were divided into 20 parts based on the source. A 4-gram model is trained with modified Kneser-Ney smoothing for each source, and then the 20 component models are linearly interpolated with the interpolation weights chosen to optimize perplexity on a held-out set. In order to build a Levantine language model, the text dialect annotator described above was run on each of the 20 text sources and 4-gram language models were built on the 20 dialectal subparts. The new 20 dialect language models were interpolated with the 20 original ones. The interpolation weights of the 40 language models were optimized on a levantine held-out set. Table XI, below, illustrates the improvements obtained by adding dialect data to the original language model. Note that the improvement from adding dialect language models is less than the one obtained from dialect acoustic models in the examples described above.

One reason for this is the fact that the initial dialect data is selected from the BC part of the training data, and the BC language model has a high weight in the baseline interpolated LM.

TABLE XI

LM Rescoring With Levantine LM

| Training data | WER |
| --- | --- |
| 913 m 4-gram baseline LM | 36.3% |
| +3-gram Levantine LM from 238 h set | 35.4% |
| +4-gram Levantine weighted LM (all text sources) | 35.1% |

It should be further noted that the system can identify dialectal words if the system computes the number of times the word occurs in the Levantine corpus vs. the number of times the word occurs in the MSA corpus. After sorting the count ratios, the following words were ranked at the top of the list: Em, hyk, bdw, bdk, ylly, blbnAn, which are in fact Levantine words. Note that identifying dialectal words can be useful for building better pronunciation dictionaries for dialects as well as for machine translation.

The dialect recognition methods and systems described herein enable the identification of relevant training subsets and substantially improves the training of models using these subsets. Furthermore, the speech recognition methods and systems described above enable the combination of a plurality of language models, including dialect language models, without sacrificing performance in most cases. Furthermore, the ASR methods and systems enable the use of the multiple models simultaneously by implementing dynamic selection between the models at decode time or by employing a soft-weighted scheme.

Figure 6:
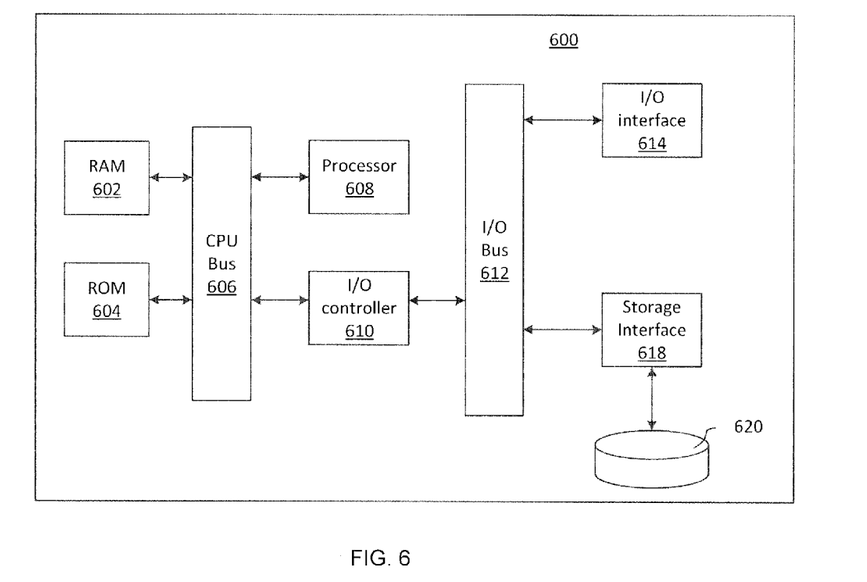
FIG. 6 is a high-level block diagram of a computing system in which system embodiments of the present principles can be implemented and by which method embodiments of the present principles can be implemented.

With reference now to FIG. 6, an exemplary computing system 600 in which system embodiments of the present principles described above can be implemented, and by which method embodiments of the present principles described above can be implemented, is illustrated. The computing system 600 includes a hardware processor 608 that can access random access memory 602 and read only memory 604 through a central processing unit bus 606. In addition, the processor 608 can also access a storage medium 620 through an input/output controller 610, an input/output bus 612 and a storage interface 618, as illustrated in FIG. 6. For example, the language models 504 can be stored in and accessed form the storage medium 620. The system 600 can also include an input/output interface 614, which can be coupled to a display device, keyboard, mouse, touch screen, external drives or storage mediums, etc., for the input and output of data to and from the system 600. For example, the data sets 202, 402 and 502 described above can be input into the system 600 through the interface 614 and the ASR results 504 can be output from the system 600 through the interface 614. In accordance with one exemplary embodiment, the processor 608 can access software instructions stored in the storage medium 620 and can access memories 602 and 604 to run the software and thereby implement methods 100 and 400 described above. In addition, the processor 608 can implement each of the system elements described above, such as the controller 201, phone decoder 204, the kernel module 212 and the model builder 310. Alternatively, each of these system elements can be implemented via a plurality of processors 608.

Having described preferred embodiments of systems and methods for dialect-specific acoustic language modeling and speech recognition (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for training acoustic models for automatic speech recognition comprising:

building a dialect recognition system configured to identify at least one dialect of a standard form language in input data by distinguishing phones of the standard form language and the at least one dialect, the building the dialect recognition system further comprising generating a phone decoder for building an acoustic training data set;

applying the dialect recognition system with at least one processor to identify portions of the acoustic training data set that conform to the at least one dialect based on distinguished phones of the at least one dialect in the training data set; and performing automatic speech recognition using at least one dialect language model trained based on the portions of the acoustic training data set that are identified as conforming to the at least one dialect.

2. The method of claim 1, wherein the applying further comprises applying the dialect recognition system to identify portions of the acoustic training data set that conform to the standard form language.

3. The method of claim 2, wherein the training further comprises training a standard form language model for automatic speech recognition based on the portions of the acoustic training data set that are identified as conforming to the standard form language.

4. The method of claim 2, wherein the training comprises training the at least one dialect language model based on the portions of the acoustic training data set that are identified as conforming to the standard form language.

5. The method of claim 4, wherein each of the portions is a respective utterance in the training data set.

6. The method of claim 5, wherein the applying comprises determining posterior probability scores for each of the utterances indicating a respective probability that the corresponding utterance conforms to the standard form language and a respective probability that the corresponding utterance conforms to the at least one dialect.

7. The method of claim 6, wherein the training comprises weighting each of the utterances by the corresponding posterior probability scores for the utterance.

8. The method of claim 1, wherein the building comprises building general phone representations for the standard form language and building phone representations for the at least one dialect by adapting the general phone representations.

9. The method of claim 1, wherein the building comprises building a support vector machine classifier based on kernel values determined for different pairs of dialects of the standard form language.

10. A method for automatic speech recognition comprising:

identifying at least one dialect of a standard form language in input data by distinguishing phones of the standard form language and the at least one dialect, the identifying further comprising generating a phone decoder for building an acoustic input training data set;

analyzing the acoustic input data set to identify portions of the input data set that conform to a standard form language and to identify portions of the input data set that conform to at least one dialect of the standard form language;

performing automatic speech recognition by applying, with at least one hardware processor, a standard form language model and at least one dialect language model to the input data set, the performing including dynamically selecting between the models in accordance with each of the identified portions; and outputting speech recognition results obtained in accordance with said applying.

11. The method of claim 10, wherein the applying comprises applying a single decoding graph including different decision trees corresponding to the standard form language model and the at least one dialect language model.

12. The method of claim 10, wherein the analyzing comprises distinguishing phones of the standard form language and the at least one dialect.

13. A method for automatic speech recognition comprising:

identifying at least one dialect of a standard form language in input data by distinguishing phones of the standard form language and the at least one dialect, the identifying further comprising generating a phone decoder for building an acoustic input training data set;

analyzing the acoustic input data set to compute probabilities that portions of the input data set conform to a standard form language and probabilities that the portions of the input data set conform to at least one dialect of the standard form language;

performing automatic speech recognition by applying, with at least one hardware processor, a standard form language model and at least one dialect language model to the input data set, the performing including weighting the models in accordance with each of the computed probabilities; and outputting speech recognition results obtained in accordance with said applying.

14. The method of claim 13, wherein the applying comprises applying a single decoding graph including different decision trees corresponding to the standard form language model and the at least one dialect language model.

15. The method of claim 13, wherein the analyzing comprises distinguishing phones of the standard form language and the at least one dialect.

16. The method of claim 13, wherein each of the portions is a respective utterance in the input data set.

17. The method of claim 16, wherein the applying comprises computing, for each of the utterances, a weighted sum of log likelihoods determined in accordance with the standard form language model and the at least one dialect language model.

18. The method of claim 13, wherein the analyzing comprises employing general phone representations for the standard form language and phone representations for the at least one dialect that are constructed by adapting the general phone representations.

19. The method of claim 18, wherein the analyzing comprises employing a support vector machine classifier that is based on kernel values for different pairs of dialects of the standard form language.

20. The method of claim 13, wherein the applying is implemented in a single decoding pass.

* * * * *